United States Patent
Sasaki

(10) Patent No.: US 8,233,176 B2
(45) Date of Patent: Jul. 31, 2012

(54) PRINT DEVICE WITH LAYOUT REPLACEMENT UNIT

(75) Inventor: Hiroyuki Sasaki, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1292 days.

(21) Appl. No.: 11/864,374

(22) Filed: Sep. 28, 2007

(65) Prior Publication Data
US 2008/0079996 A1 Apr. 3, 2008

(30) Foreign Application Priority Data
Sep. 29, 2006 (JP) .................................. 2006-269709

(51) Int. Cl.
*G06F 3/12* (2006.01)
(52) U.S. Cl. ...... 358/1.15; 358/1.18; 709/202; 709/203; 709/219; 715/235; 715/243; 715/249
(58) Field of Classification Search ................. 358/1.15, 358/1.18; 400/76; 709/202, 203, 219; 715/205, 715/235, 243, 249
See application file for complete search history.

(56) References Cited

U.S. PATENT DOCUMENTS

| | | | | |
|---|---|---|---|---|
| 6,023,714 | A * | 2/2000 | Hill et al. ........................ | 715/235 |
| 6,269,395 | B1 * | 7/2001 | Blatherwick et al. ......... | 709/219 |
| 7,814,204 | B1 * | 10/2010 | Wang et al. .................... | 709/226 |
| 2001/0051975 | A1 * | 12/2001 | Ohtani et al. ................. | 709/202 |
| 2003/0142349 | A1 | 7/2003 | Matsunaga et al. | |
| 2004/0066530 | A1 | 4/2004 | Wu et al. | |
| 2004/0215602 | A1 * | 10/2004 | Cioccarelli ....................... | 707/3 |
| 2005/0111035 | A1 * | 5/2005 | Takamine ..................... | 358/1.15 |
| 2005/0278270 | A1 * | 12/2005 | Carr et al. ....................... | 706/25 |
| 2005/0278624 | A1 * | 12/2005 | Nishikawa et al. ........... | 715/517 |
| 2005/0289069 | A1 * | 12/2005 | Okamoto et al. ............... | 705/51 |

FOREIGN PATENT DOCUMENTS

| | | |
|---|---|---|
| EP | 1498811 A1 | 1/2005 |
| EP | 1650952 A2 | 4/2006 |
| JP | 2001-290802 A | 10/2001 |
| JP | 2001-350609 A | 12/2001 |
| JP | 2003-162396 A | 6/2003 |

(Continued)

OTHER PUBLICATIONS

Japan Patent Office; Notification of Reasons for Rejection in Japanese Patent Application No. 2006-269709 (counterpart to the above-captioned U.S. Patent Application) mailed Jan. 13, 2009.

(Continued)

*Primary Examiner* — King Poon
*Assistant Examiner* — David S Cammack
(74) *Attorney, Agent, or Firm* — Baker Botts L.L.P.

(57) ABSTRACT

A printing device capable of laying out print image data according to layout definition data that defines print layout and print an image based on the print image data, is configured to include a layout acquisition unit which obtains second layout definition data if first layout definition data is included in a print job provided to the printing device, a layout replacement unit which replaces the first layout definition data included in the print job with the second layout definition data obtained by the layout acquisition unit, an image generation unit which lays out and generates print image data according to the second layout definition data replaced by the layout replacement unit, and a print execution unit which executes printing based on the print image data generated by the image generation unit.

19 Claims, 14 Drawing Sheets

FOREIGN PATENT DOCUMENTS

| | | |
|---|---|---|
| JP | 2003296050 A | 10/2003 |
| JP | 2004127133 A | 4/2004 |
| JP | 2004-288096 A | 10/2004 |
| JP | 2005-014459 A | 1/2005 |
| JP | 2005031983 A | 2/2005 |
| JP | 2005-170037 A | 6/2005 |
| JP | 2005-352696 A | 12/2005 |
| JP | 2006134047 A | 5/2006 |
| JP | 2006-255916 A | 9/2006 |

OTHER PUBLICATIONS

Japanese Office Action, Notification of Reasons of Rejection issued in corresponding Japanese Application No. 2006-269709, dated Jun. 17, 2008.

European Patent Office, European Search Report for Related EP Application No. 07253841 dated Oct. 9, 2008.

* cited by examiner

FIG.5A

REPLACEMENT CSS DATA SEARCH TABLE AREA (433)

T1 No. OF REGISTERED HOSTS DATA

| No. OF REGISTERED HOST | nh |
|---|---|

T2 REGISTERED HOSTS INFORMATION TABLE

| idx | INFORMATION REGARDING HOSTS | DATE AND TIME OF LAST UPDATE | NUMBER OF CSS SEARCH KEYS | LINK TO CSS SEARCH TABLE |
|---|---|---|---|---|
| 0 | INFORMATION REGARDING HOST 0 | DATE AND TIME 0 | 2 | LINK 0 |
| 1 | INFORMATION REGARDING HOST 1 | DATE AND TIME 1 | 5 | LINK 1 |
| ⋮ | ⋮ | ⋮ | ⋮ | ⋮ |
| nh-1 | INFORMATION REGARDING HOST (nh-1) | DATE AND TIME (nh-1) | 9 | LINK (nh-1) |

T3 CSS SEARCH TABLE

| SEARCH KEY | No. OF CSS DATA | DECISION RULE | CSS DATA INFORMATION | | |
|---|---|---|---|---|---|
| KEY 0 | 5 | 0 | INFORMATION 1:0:0 | ••• | INFORMATION 1:0:4 |
| KEY 1 | 3 | 1 | INFORMATION 1:1:0 | ••• | INFORMATION 1:1:2 |
| ⋮ | ⋮ | ⋮ | ⋮ | | |
| KEY 4 | 3 | 1 | INFORMATION 1:3:0 | ••• | INFORMATION 1:3:5 |

FIG.5B

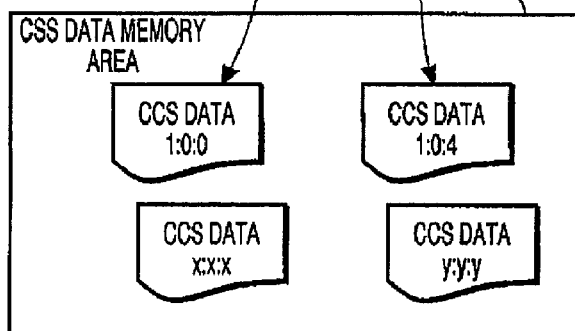

CSS DATA MEMORY AREA (432) containing CCS DATA 1:0:0, CCS DATA 1:0:4, CCS DATA x:x:x, CCS DATA y:y:y

FIG.5C

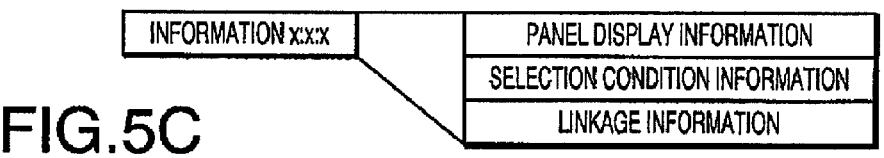

INFORMATION x:x:x — PANEL DISPLAY INFORMATION / SELECTION CONDITION INFORMATION / LINKAGE INFORMATION

```
<?xml version="1.0" encoding="UTF-8"?>
<!DOCTYPE html PUBLIC "-//W3C//DTD XHTML-Print 1.0//EN"
    "http://www.w3.org/MarkUp/DTD/XHTML-Print10.dtd">
<html xmlns="http://www.w3.org/1999/xhtml">
<head>
<title>picture layout print</title>
<base href="http://xxx.xxx.xxx.xxx/yyy/" />

<link rel="stylesheet" type="text/css"         ⎫
      href="http://zzz.zzz.zzz/style1.css">    ⎬ 21
                                               ⎭
</head>

<body>
 .
 .
 .
</body>
</html>
```

FIG.6A

```
<?xml version="1.0" encoding="UTF-8"?>
<!DOCTYPE html PUBLIC "-//W3C//DTD XHTML-Print 1.0//EN"
    "http://www.w3.org/MarkUp/DTD/XHTML-Print10.dtd">
<html xmlns="http://www.w3.org/1999/xhtml">
<head>
<title>picture layout print</title>
<base href="http://xxx.xxx.xxx.xxx/yyy/" />

<style type="text/css">

H1 { color:red; font-size: large }      ⎫
H2 { color: green; font-size: medium }  ⎬ 22
                                        ⎭
</style>
</head>

<body>
 .
 .
 .
</body>
</html>
```

FIG.6B

PRINT DEVICE WITH LAYOUT REPLACEMENT UNIT

CROSS REFERENCE TO RELATED APPLICATION

This application claims priority from Japanese Patent Application No. 2006-269709, filed on Sep. 29, 2006, the entire subject matter of which is incorporated herein by reference.

BACKGROUND OF THE INVENTION

1. Field of the Invention

The present invention relates to a printing device and a recording medium containing a computer program which causes a printing device to execute a printing job.

2. Related Art

Conventionally, there is a case that a device as a host conforming to DLNA (Digital Living Network Alliance: registered trade mark) guideline issues a print job to a printing device that is also conforming to DLNA (Digital Living Network Alliance: registered trade mark) guideline.

In this occasion, the issued print job may include print data described conforming to XHTML-print standard, or may include a URI (URL) indicating a location where print data described conforming to XHTML-print standard exists. The printing device executes printing by analyzing XHTML-print data included in the issued print jobs or XHTML-print data retrieved by using the indicated URI.

In addition, the host device (hereinafter, referred to also as simply "host") may issue a print job which includes print setting information such as CSS (Cascade Style Sheet) data that is a description to indicate print layout. A print layout instruction by CSS data may be directly described in XHTML-print data, or a URI linked to the CSS data may be described in the XHTML-print data. An example of such a configuration is disclosed in Japanese Patent Application Provisional Publication P2004-127133A.

For example, a device as a host conforming to the above DLNA (registered trademark) guideline is configured to include CSS data in a print job so as to instruct printing with layout preliminarily setup suitable for characteristics of the device.

However, in a situation where CSS data prepared by a host device is included in a print job, a printing device cannot execute the print job with other layout besides the layout which the host device indicates in the CSS data. Therefore, variations of print layouts are limited.

SUMMARY OF THE INVENTION

In consideration of the above-described background, the present invention is advantageous in that there is provided a printing device with which printing can be executed with changing the print layout flexibly.

According to aspects of the invention, there is provided a printing device which is able to layout print image data according to layout definition data that defines printing layout and print an image based on the print image data. The printing device is provided with a layout acquisition unit which obtains second layout definition data if first layout definition data is included in a print job provided to the printing device, a layout replacement unit which replaces the first layout definition data included in the print job with the second layout definition data obtained by the layout acquisition unit, an image generation unit which lays out and generates print image data according to the second layout definition data replaced by the layout replacement unit, and a print execution unit which executes printing based on the print image data generated by the image generation unit.

According to another aspect of the invention, there is provided a printing device which is connected to a network to which plural host devices are connected and capable of executing printing according to a print job transmitted from one of the host devices via the network. The printing device is provided with a storage unit which accumulates plural layout definition data which define printing layouts, a first layout acquisition unit which obtains second layout definition data replaceable with first layout definition data by searching in the storage unit in a case that the print job transmitted via the network includes the first layout definition data, a second layout acquisition unit which obtains second layout definition data replaceable with first layout definition data from a layout providing server connected to the network in a case that a replaceable second layout definition data does not exist in the storage unit, a layout replacement unit which replaces the first layout definition data included in the print job with the obtained second layout definition data, an image generation unit which lays out and generates print image data according to the second layout definition data replaced by the layout replacement unit, and a print execution unit which executes printing based on the print image data generated by the image generation unit.

According to further aspects of the invention, there is provided a computer-readable recording medium storing a program containing instructions which, when executed by a computer of a printing device, causes the computer to implement a layout acquisition unit which obtains second layout definition data if a print job provided to the printing device includes a first layout definition data, a layout replacement unit which replaces the first layout definition data included in the print job with the second layout definition data obtained by the layout acquisition unit, an image generation unit which lays out and generates print image data according to the second layout definition data replaced by the layout replacement unit, and a print execution unit which executes printing based on the print image data generated by the image generation unit.

Since by utilizing such printing devices or a computer program, layout definition data such as CSS data contained in a print job can be replaced with other layout definition data, it is possible to print in various layouts without being limited to the layout definition data which is indicated by the host device which requires printing. Specifically, utilizing only functions of the printing device, variations of printing can be increased without changing the host device.

BRIEF DESCRIPTION OF THE ACCOMPANYING DRAWINGS

FIG. 5A shows contents of the replacement CSS data search table area.

FIG. 5B shows contents of the CSS data memory area.

FIG. 5C shows contents of the CSS data information.

FIG. 6A shows an example of XHTML-print format data which indicates a location by referencing to a URI.

FIG. 6B shows an example of XHTML-print format data indicated by describing CSS data directly.

DETAILED DESCRIPTION OF THE EMBODIMENT

Next, embodiments of the invention are described with reference to figures accordingly. Among the referred figures, FIG. 1 is an overall configuration diagram of a network conforming to DLNA (registered trademark) where a printing device according to an embodiment of the present invention is used.

[Configuration of a DLNA (Registered Trademark) Network]

Figure 1:
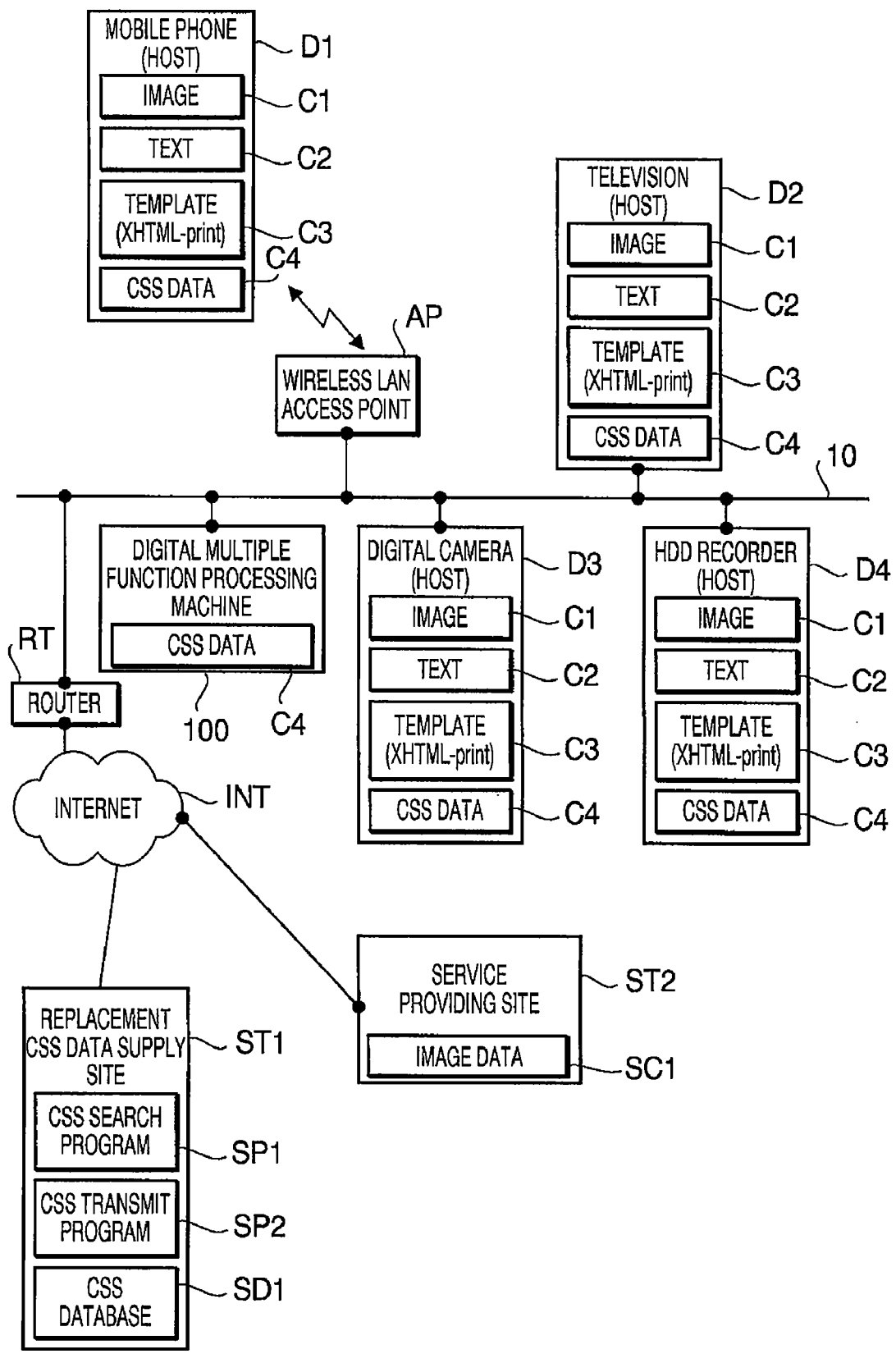
FIG. 1 is a block diagram which shows a schematic configuration of a network conforming to DLNA (registered trademark) where a printing device according to an embodiment of the present invention is used.

As shown in FIG. 1, a network conforming to DLNA (registered trademark) which is an example of a printing device according to the invention, where a digital multi function processing machine 100 is used, is configured with a LAN (Local Area Network) 10 and the Internet INT which is connected to the LAN 10 via a router RT. Besides the digital multi function processing machine 100, a mobile phone D1, a television D2, a digital camera D3, a HDD (Hard Disk Drive) recorder D4, etc., are connected to the LAN 10. It is noted that the mobile phone D1 is connected to the LAN 10 via a wireless LAN access point AP.

Each of the devices D1-D4 conforming to DLNA (registered trademark) realizes additional functions by communicating with the other devices. Further, each device D1-D4 comprises a memory device which stores contents such as, image data C1, text data C2, an XHTML-print template C3 and CSS data C4 as layout definition data of XHTML-print. It is noted that as each of the contents, not only data stored in each of the devices D1-D4 itself but also data stored in the other devices (including devices D1-D4) may be referred.

Each of the devices D1-D4 is a host device which requires the digital multi function processing machine 100 to execute printing.

On the Internet INT, as a layout providing server, a replacement CSS data providing site ST1 is installed. The replacement CSS data providing site ST1, precisely a server computer which comprises a server program and CSS data, stores a CSS search program SP1, a CSS transmission program SP2 and a CSS database SD1.

Further, the replacement CSS data providing site ST1 may be a server run by a supplier of each of the devices D1-D4 or a server run by a company which renders print layouts.

When the replacement CSS data providing site ST1 receives a CSS data search request from the digital multi function processing machine 100 or each of the devices D1-D4, the CSS search program SP1 searches for CSS data meeting the requirement in the CSS database SD1. Then, the replacement CSS data providing site ST1 transmits the obtained CSS data as a search result with the CSS transmission program SP2 to the digital multi function processing machine 100 or each of the devices D1-D4 which requires the search. Details of the CSS search program SP1 are explained later with specific steps.

In addition, a service providing site ST2 is installed on the Internet INT. The service providing site ST2 stores image data SC1 and has a function to read out the image data SC1 and transmit the data according to the requests from each of the devices D1-D4 or the digital multi function processing machine 100. For example, the service providing site ST2 is a Web server. For example, when an image to be printed is described as a link (URI) to the service providing site ST2 in the XHTML-print format data, the service providing site ST2 transmits the image corresponding to the URI.

[Configuration of the Digital Multi Function Processing Machine 100]

Figure 2:
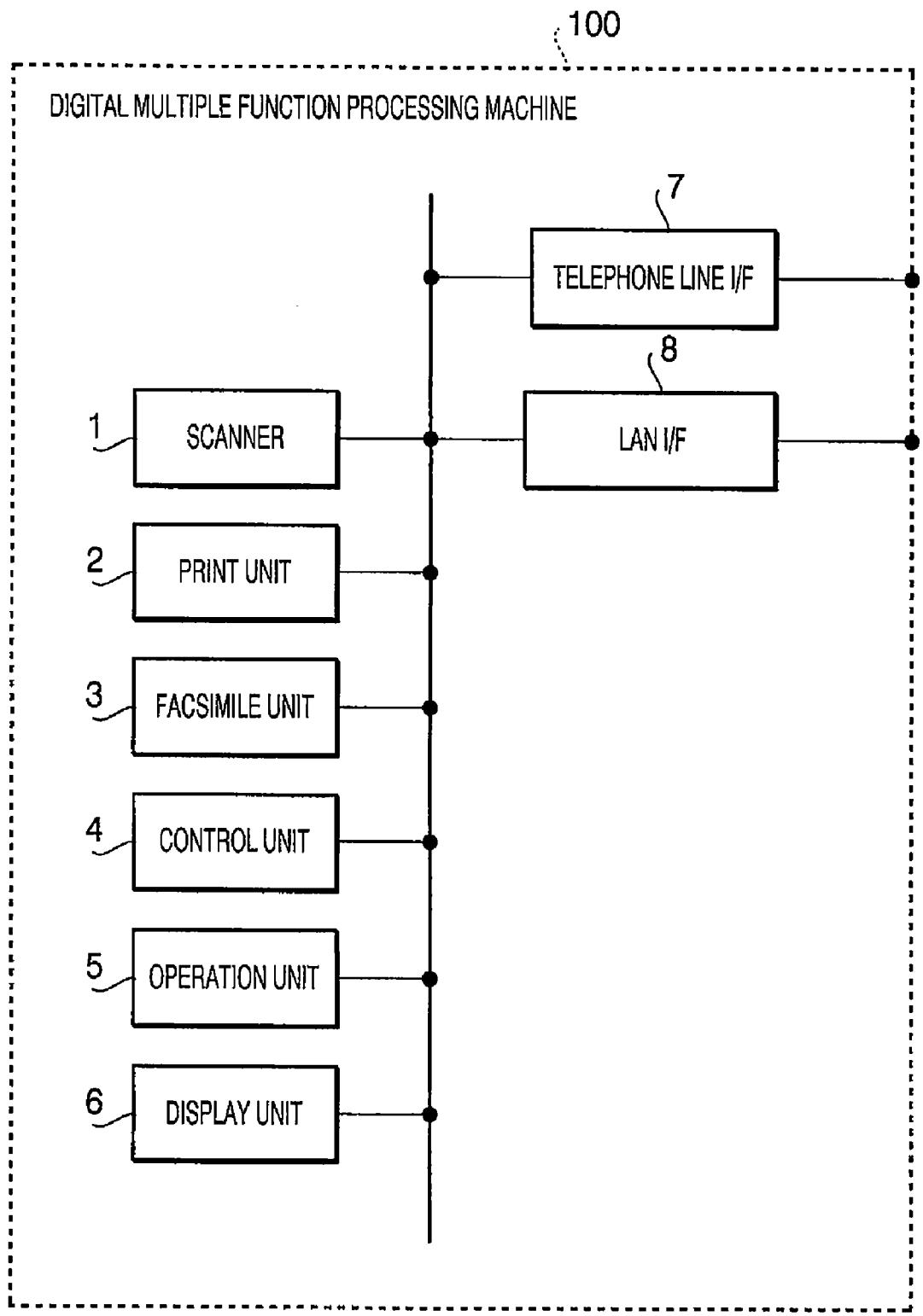
FIG. 2 is a function block diagram of a digital multi function processing machine according to the embodiment.

FIG. 2 is a function block diagram of a digital multi function processing machine according to the embodiment.

As shown in FIG. 2, the digital multi function processing machine 100 may be shown decomposed functionally into, a scanner 1, a print unit 2, a facsimile unit, a control unit 4, an operation unit 5, a display unit 6, a telephone line interface (I/F) 7, and a LAN interface (I/F) 8, wherein the devices are connected to each other so that data transfer is possible among the devices. The scanner 1 reads out documents, etc., as electronic data. The print unit 2 transfers and fixes toner to papers according to a print image in order to execute printing which is required by the host device or as a part of copying function. The facsimile unit transmits and receives an image via a telephone line. The control unit 4 controls various devices. The operation unit 5 is for inputting facsimile number, operating a copier, selecting a print layout and other operation by a user. The display unit 6 is a display device for displaying messages configured with a liquid crystal panel, etc., hereinafter, a liquid crystal panel is taken as an example.

Figure 3:
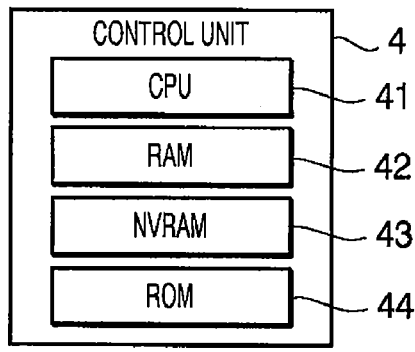
FIG. 3 is a block configuration diagram of the control unit.
Figure 4A:
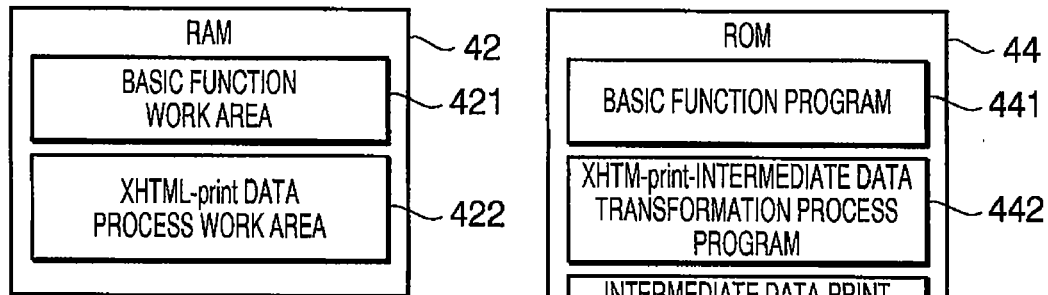
FIG. 4A shows a configuration inside the RAM.
Figure 4B:
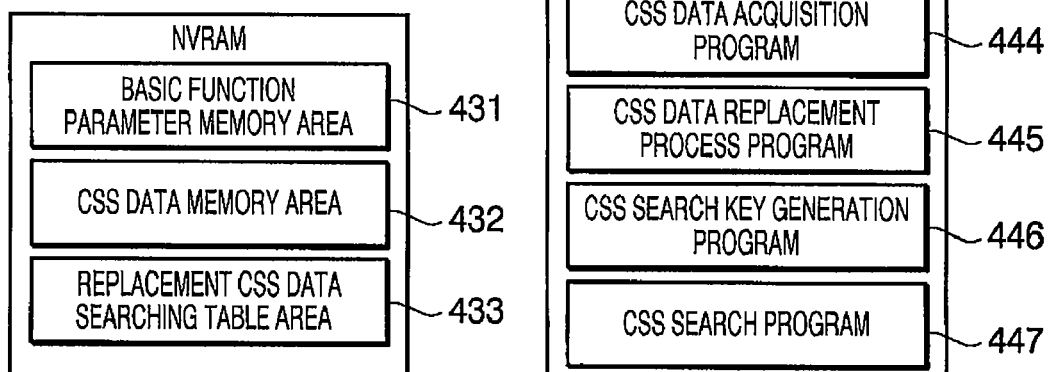
FIG. 4B shows a configuration inside the NVRAM.
Figure 4C:
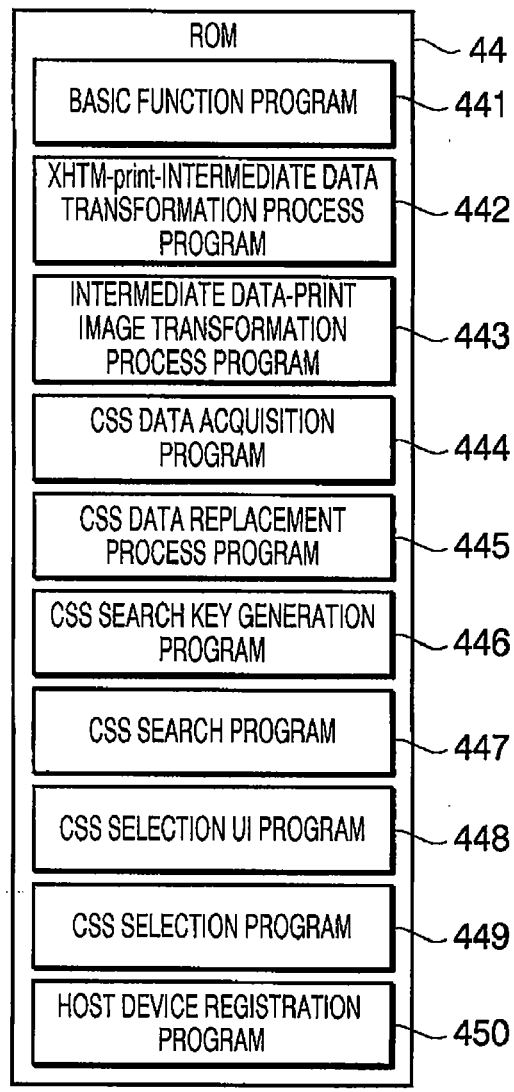
FIG. 4C shows a configuration inside the ROM.

FIG. 3 is a block configuration diagram of the control unit. FIG. 4 is a detailed block configuration diagram of the control unit. FIG. 4A shows a configuration inside the RAM. FIG. 4B shows a configuration inside the NVRAM FIG. 4C shows a configuration inside the ROM.

As shown in FIG. 3, the control unit 4 comprises a CPU (Central Processing Unit) 41 which executes calculation, data transfer, etc., a RAM (Random Access Memory) 42 which is a volatile memory device, an NVRAM (Non Volatile RAM) 43 which is a nonvolatile RAM, and a ROM (Read Only Memory) 44 which is a read out only memory device.

As shown in FIG. 4A, in the RAM 42, a basic function work area 421 and an XHTML-print data process work area 422 are secured accordingly.

As shown in FIG. 4B, in the NVRAM 43, a basic function parameter memory area 431, a CSS data memory area 432, a replacement CSS data search table area 433 are secured. Each data is stored accordingly.

As shown in FIG. 4C, in the ROM 44, a basic function program 441, an XHTML-print intermediate data transformation process program 442, an intermediate data-print data transformation program 443, a CSS data acquisition program 444, a CSS data replacement process program 445, a CSS search key generation program 446, a CSS search program 447, a CSS selection UI (User Interface) program 448, a CSS selection program 449 and a host device registration program 450 are stored.

Each of the above programs is loaded to the RAM 42 accordingly, executed by the CPU 41. Each of the above programs functions as means to control the digital multi function processing machine 100.

The basic function program 441 is a program which control operation of each of the devices in order to execute basic functions of the digital multi function processing machine such as printing, facsimile function, copy function, data input form the operation unit 5, or data output to the liquid crystal panel. The program has also a function to execute printing based on print image data.

The XHTML-print intermediate data transformation process program 442 is a program which transforms XHTML-print type format data in the print job transmitted from each of the devices D1-D4 into print data that is intermediate data according to the CSS data that is layout definition data.

The intermediate data-print data transformation program 433 is a program which transforms data generated by the XHTML-print intermediate data transformation process program 442 into print image data that is configured to be a bitmap.

The CSS data acquisition program 444 is a program which searches for and obtains CSS data in the replacement CSS data providing site ST1, via the network utilizing the LAN 10 and the Internet INT. That is the CSS data acquisition program 444 searches for and obtains replacement CSS data as second layout definition data using information of a device which transmitted the print job or the CSS data as first layout definition data included in the print job as a key from the replacement CSS data providing site ST1.

The CSS data replacement process program 445 is a program which describes the replacement CSS data (second layout definition data) searched for and obtained by the CSS data acquisition program 444 and the CSS search program 447 which is described later in the XHTML-print format data transmitted as a print job and replace the data with the former CSS data (first layout definition data).

The CSS search key generation program 446 is a program which calculates a bash value that is a search key when CSS data is searched for from the replacement CSS data providing site ST1 on the Internet INT, the CSS data memory area 432 of the digital multi function processing machine 100 and the replacement CSS data search table area 433.

The CSS search program 447 is a program which searches for CSS data suitable for the print job using the hash value, device names of the devices D1-D4, etc., as a key from the CSS data memory area 432 of the digital multi function processing machine 100 and the replacement CSS data search table area 433. That is, the CSS search program 447 searches for and obtains replacement CSS data as second layout definition data from the NVRAM 43 using information of a device which transmitted the print job or the CSS data as first layout definition data included in the print job as a key.

The CSS selection UI program 448 is a program which displays a user interface that prompts selection of CSS data on the display unit 6 of the liquid crystal panel, etc., when a plurality of candidates of CSS data are obtained by the CSS data acquisition program 444 or the CSS search program 447.

The CSS selection program 449 is a program which determines the replacement CSS data to be applied to the print job by a user's operation of the operation unit 5 with respect to selection option displayed on the liquid crystal panel by the CSS selection UI program 448. Further, the CSS selection program 449 is a program which determines replacement CSS data to be applied to the print job.

The host device register program 450 is a program which stores information of the host device in the NVRAM 43 by the user's operation, obtains replacement CSS data for the host device from the replacement CSS data providing site ST1 via the Internet INT, and accumulates the data in the NVRAM 43, when a user connects a new host device to the LAN 10.

FIG. 5 shows contents of a CSS data memory area 432 and a replacement CSS data search table area 433. FIG. 5A shows contents of the replacement CSS data search table area 433. FIG. 5B shows contents of the CSS data memory area 432. FIG. 5C shows contents of the CSS data information.

As shown in FIG. 5A, a number of registered hosts data T1, a registered hosts information table T2, and a CSS search table T3 are stored in the replacement CSS data search table area 433.

The number of registered host's data T1 is a number of host devices registered in the digital multi function processing machine 100. For example, when four devices D1-D4 are registered on the LAN 10 as shown in FIG. 1, as a number of registered hosts nh, 4 is stored.

The registered hosts information table T2 is a table which manages information of host devices registered in the digital multi function processing machine 100.

For example, since 4 host devices are registered on the LAN 10 shown in FIG. 1, four records which have index (idx) 0-3 are generated. Information relates to the host, last update date and time of the information, number of the CSS search keys, and linkages to the CSS search table are stored in the registered hosts information table T2.

The number of the CSS search keys is a number of keys for searching for CSS data groups which are stored in the CSS search table T3. The number is defined corresponding to each of devices conforming to DLNA (registered trademark).

A linkage to the CSS search table T3 is information indicating in which memory area in the CSS data memory area 432 where the digital multi function processing machine 100 stores a search is executed. The linkage is defined corresponding to each of the devices conforming to DLNA (registered trademark).

The CSS search table T3 stores relations between search keys and CSS data information for each of the devices conforming to DLNA (registered trademark). Further, the CSS search table T3 shown in FIG. 5A corresponds to link 1 which is related to index 1 of the registered hosts information table T2. The search keys may be, for example, hash values which are calculated in hash operation of CSS data or information indicating CSS data location described in a print job as first layout definition data. Indication of the CSS data may be done by describing a URI linked to CSS data as in the case of a layout definition section 21 of the XHTML-print format data shown in FIG. 6A, or by describing directly the CSS data in the XHTML-print data as in the case of a layout definition section 22 of the XHTML-print format data shown in FIG. 6B.

In addition, the search keys may be types of the host devices, values of hash operation of layout names, or data generated based on the types of the host devices and the layout names.

In the example shown in FIG. 5A, a number of search keys are 5 (from [key 0] to [key 4]), since a number of CSS search keys of index 1 of the registered hosts information table T2 is [5].

The number of multiple CSS data is a number of pieces of CSS data information corresponding to each search key. For example, 5 pieces of CSS data information, [information 1:0:0]-[information 1:0:4] corresponds to [key 0] in FIG. 5A. The number of pieces of the CSS data information is a number of the multiple CSS data to be replaced, that is, a number of candidates for second layout definition data.

The decision rules are rules to determine one of the plurality of candidates for CSS data (second layout definition data). In an example shown in FIG. 5A, numbers 0, 1, 2 . . . , etc., are assigned. For example, 0 means a selection by a user, 1 means a selection due to the day and time when the print job is issued, and 2 means selection due to a date and time (for example, a shooting date and time) related to documents (pictures, etc.).

The CSS data information is information indicating a location of a CSS data memory area where the actual CSS data is stored. For example, as shown in FIG. 5C, the CSS data information includes panel display information, selection condition information, and linkage information.

The panel display information is information which is displayed on a liquid crystal panel when one of the candidates for CSS data is determined by a user's selection. For example, according to CSS data, titles of print layouts, such as [Christmas], [summer], [Sky] are displayed.

The selection condition information is information related to CSS data when candidates are determined due to certain conditions. For example, when one of the multiple CSS data is determined due to a day and time of printing or related to documents, information indicating periods such as [December 10-December 25], [June-August] are used as selection condition information.

The linkage information is information which indicates a CSS data memory area where CSS data is stored.

The above described CSS search program 447 firstly obtains a search key from the section indicating CSS data in the print job. Secondly, the CSS search program 447 retrieves CSS data information related to the search key corresponding to the above described required search key for which is searched from the CSS search table T3 indicated by the registered hosts information table T2 when the CSS data is searched for in the digital multi function processing machine 100. Then, according to the decision rules related to the corresponding to the search key, replacement CSS data as second layout definition data (see FIG. 5B) is obtained from the memory area indicated by the linkage information in the CSS data information.

[Functions of a Digital Multi Function Processing Machine 100]

Next, concrete functions of the digital multi function processing machine 100 are explained with reference to flowcharts shown in FIGS. 7-17.

<<Activating Time>>

Figure 7:
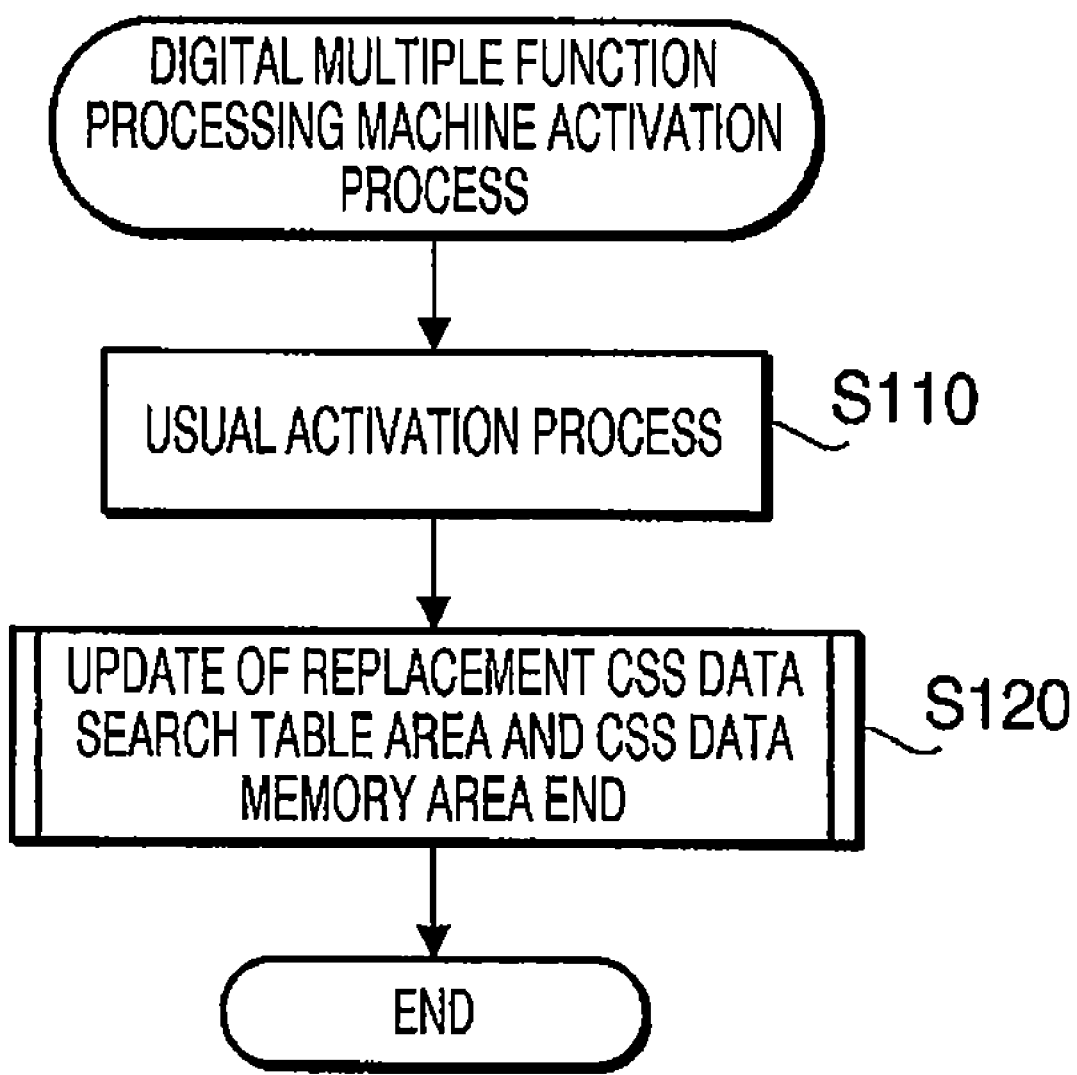
FIG. 7 is a flowchart which shows an activating process of a digital multi function processing machine.

FIG. 7 is a flowchart which shows an activating process of a digital multi function processing machine.

When the digital multi function processing machine 100 is activated, a usual activation process such as warming up, reading in programs of various basic functions is executed (S110). Then, a process of updating a replacement CSS data search table area 433 and a CSS data memory area 432 is executed (S120).

Figure 8:
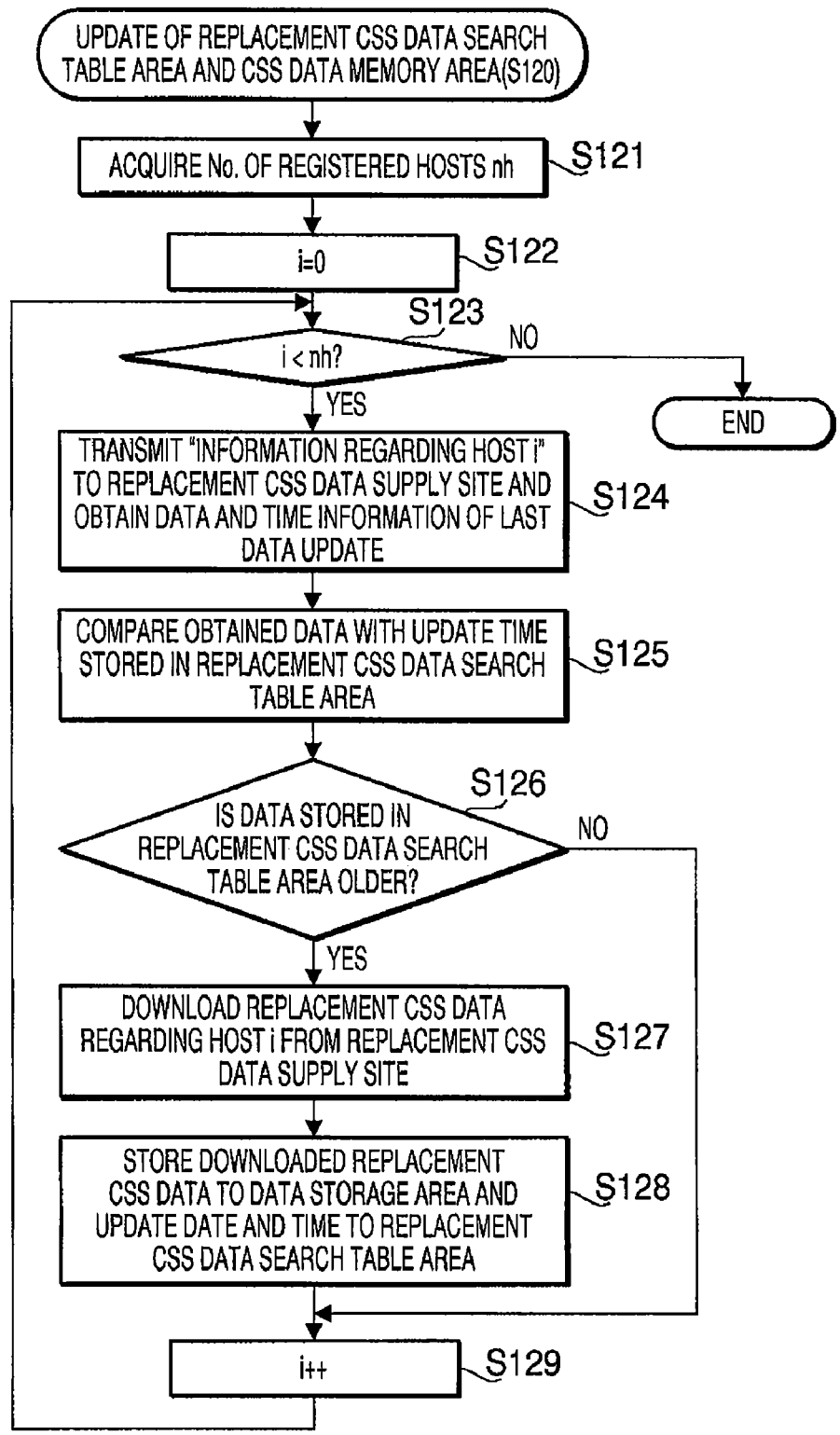
FIG. 8 is a flowchart which shows a process of updating a replacement CSS data searching table area and a CSS data memory area.

FIG. 8 is a flowchart which shows a process of updating a replacement CSS data searching table area 433 and a CSS data memory area 432.

As shown in FIG. 8, when CSS replacement data in the control unit 4 of the digital multi function processing machine 100 is updated, firstly, registered hosts number data T1 in the replacement CSS data search table area 433 is referred, and a registered hosts number nh is obtained (S121).

Then, a value of a counter i is set to be 0 (S122). Next, if the value i is larger than the registered hosts number nh (S123, No), the process is terminated. If i is smaller (S123, Yes), a process obtaining CSS data is executed (S124-S129).

The acquisition process is to transmit information related to the host i to the replacement CSS data providing site ST1 which is a layout providing server, and update a day and time information of the CSS replacement data (S124).

Then, the obtained update date and time and the update date and time of the host i [date and time i] stored in the replacement CSS data search table area 433 are compared (S125).

As a result of the comparison, if the data in the replacement CSS data search table area 433 is older (S126, Yes), replacement CSS data relating to the host i is downloaded from the replacement CSS data providing site ST1 (S127), and the downloaded replacement CSS data is stored (accumulated) in the CSS data memory area 432 and the update date and time is stored (accumulated) in the replacement CSS data search table area 433 as the last update date and time (S128). In addition, in Step S126, if the data in the replacement CSS data search table area 433 is not older (S126, No), the download process of the replacement CSS data is not executed.

Then, the value of the counter i is incremented (S129), the processes from the step S123 are repeated.

It is noted that in FIG. 7, the process of the step S120 is executed at the activation time. The process may be executed in a prescribed period interval during idling status. Here, the idling status means a status when any of various jobs such as a print job is not received.

<<Host Device Registration Time>>

Figure 9:
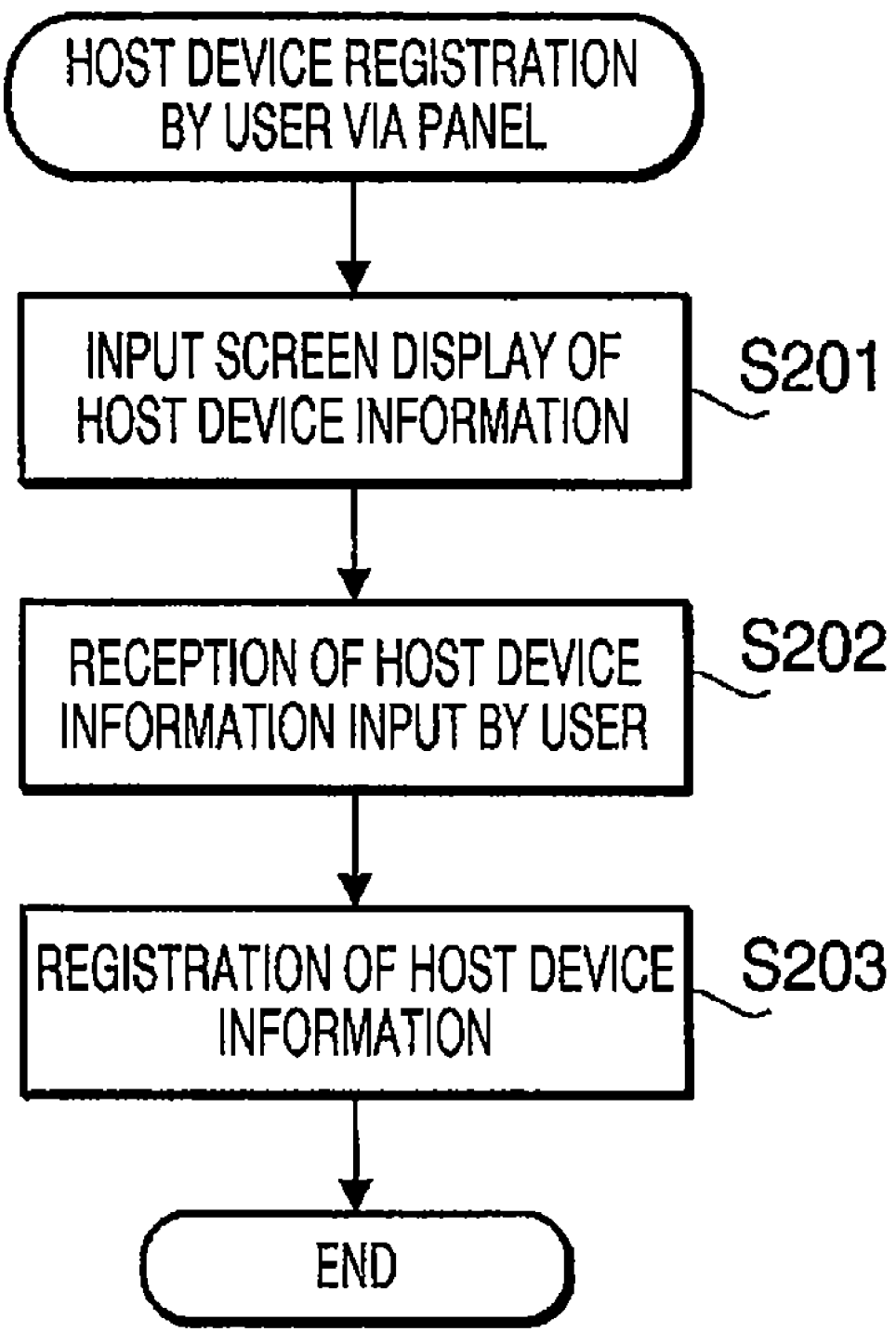
FIG. 9 is a flowchart which shows a user's registering a host device.

FIG. 9 is a flowchart which shows a user's registering a host device.

When a user purchased newly a host device such as a mobile phone D1, the control unit 4 executes the host device registration program 450 by the user's prescribed operation, and an input screen for host device information is displayed on the liquid crystal panel (S201).

Then, the control unit 4 receives host device information input by the user's operation of buttons, etc., of the operation unit 5 (S202). When the user inputs necessary information such as a device type name, information thereof is stored in the replacement CSS data search table area 433 (S203).

Further, host device registration may not be done by the user's manual operation as described above. Complying to UPnP (Universal Plug and Play) specification, through the procedure detecting each other among devices on the LAN and exchanging information related to each of the devices, host device information may be automatically stored in the replacement CSS data search table area 433.

<<Print Process>>

Figure 10:
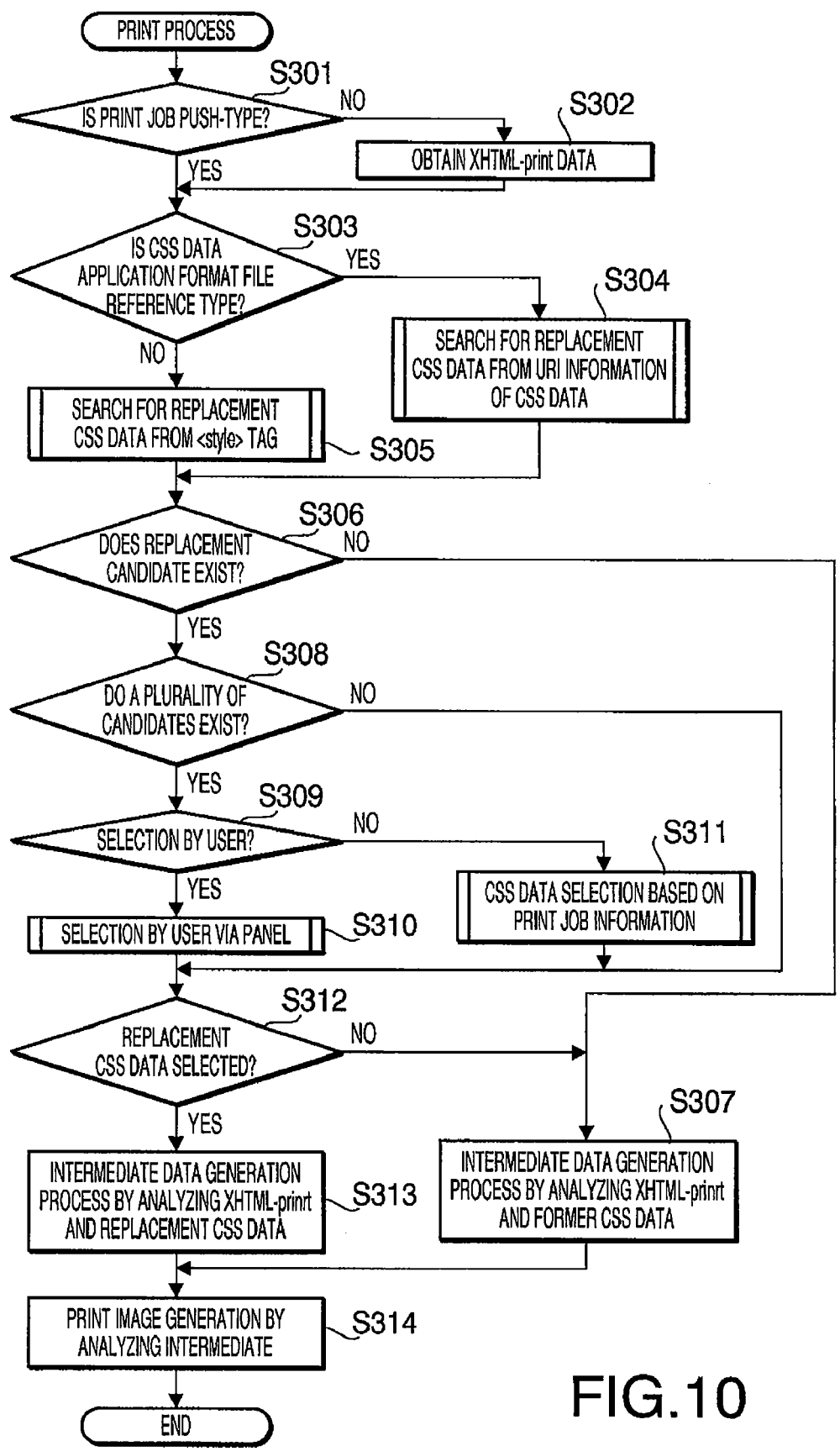
FIG. 10 is a flowchart which shows a print process of the digital multi function processing machine according to the embodiment.

Next, details of a print process are explained. FIG. 10 is a flowchart which shows a print process of the digital multi function processing machine 100 according to the embodiment. When the control unit 4 receives a print job from a host device, it is determined whether the print job is push type (S301).

There are two patterns of issuing print jobs, push type and pull type.

The push type pattern is a pattern where XHTML-print format data is directly transmitted to the digital multi function processing machine 100. The pull type pattern is a pattern where URI linking to the place XHTML-print format data is stored is transmitted to the digital multi function processing machine 100.

In a case of the push type pattern, for example, when a television D2 issues a print job to print an image in a digital camera D3, the television D2 generates XHTML-print format data using text data C2, template C3 and CSS data C4 in the television D2. At the same time, as for image data, XHTML-print format data is generated describing a URI referring to an image in the digital camera D3. The digital multi function processing machine 100 obtains the image with the URI and generates intermediate data.

In a case of the pull type pattern, for example, a mobile phone D1 instruct the television D2 to generate XHTML-print format data for printing, and the television D2 generates XHTML-print format data in the same way as described in the case of the push type pattern. The mobile phone D1 issues the URI linked to the XHTML-print format data as a print job to the digital multi function processing machine 100, and the digital multi function processing machine 100 obtains XHTML-print format data from the URI and generates intermediate data.

Back to the explanation of the print process, if the print job is push type (S301, Yes), since XHTML-print format data is obtained, the process goes to Step S303. If the print job is not push type, that is, the print job is pull type, (S301, No), there is an instruction in the print job to retrieve print data from the indicated server indicated by the host device, the indicated server is requested to transmit the XHTML-print format data and the data is obtained (S302).

Figure 11:
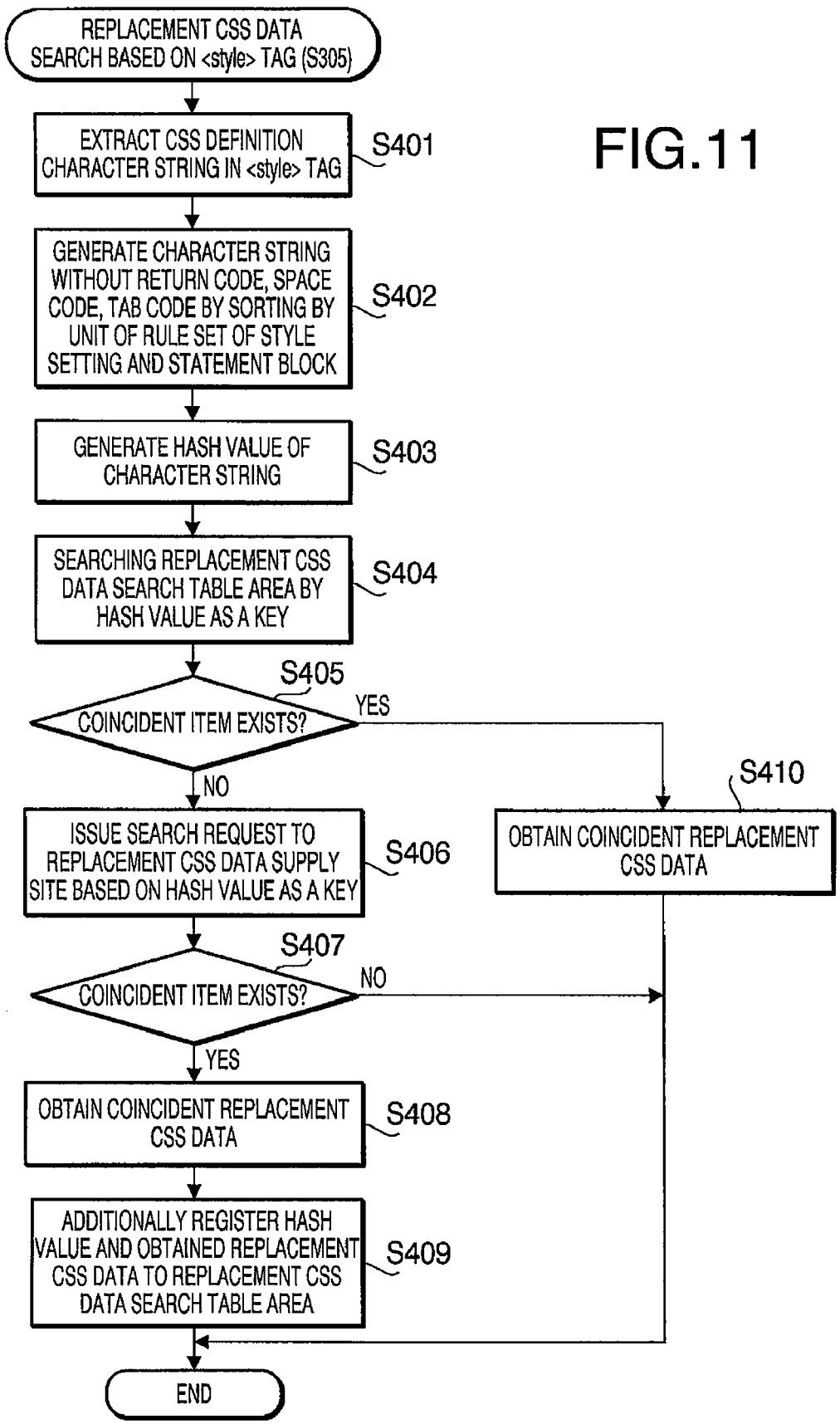
FIG. 11 is a flowchart which shows a process of searching for replacement CSS data using <style> tags.

Then, the control unit 4 determines whether application format of CSS data, that is, acquisition format of CSS data indicated in the XHTML-print format data is file reference type (S303). If the data is file-reference type, that is, as shown in FIG. 6 A, CSS data is obtained with reference to the indicated URI, CSS data is searched for from a location indicated by the URI information linked to CSS data (S304). Details of the search process are shown in FIG. 11 which is described later. On the other hand, if the data is not a file reference type (S303, No), CSS data to be replaced is searched for among <style> tags of the XHTML-print format data (S305). Details of the process are also described later.

Then, as a result of CSS data search, it is determined whether there exists a replacement candidate (S306). If there is no replacement candidate (S306, No), intermediate data is generated (S307) by interpreting the former CSS data indicated in the XHTML-print format data with a XHTML-print intermediate data transformation process program 442.

If there is a replacement candidate (S306, Yes), it is determined whether there exist a plurality of replacement candidates (S308). If there is only one replacement candidate (S308, No), since the replacement CSS data is determined, the process goes to Step S312.

Figure 13:
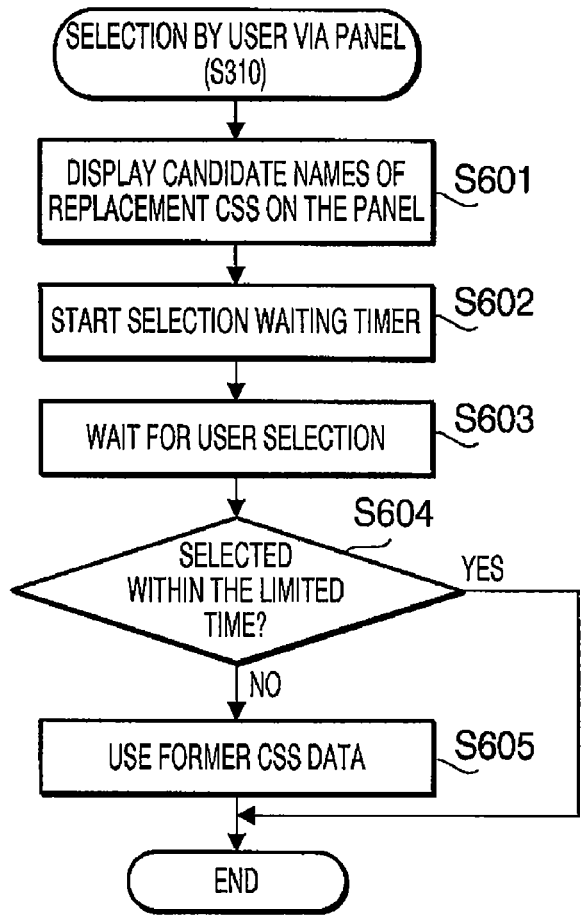
FIG. 13 is a flowchart which shows a process of making a user to select replacement CSS data with a liquid crystal panel.
Figure 14:
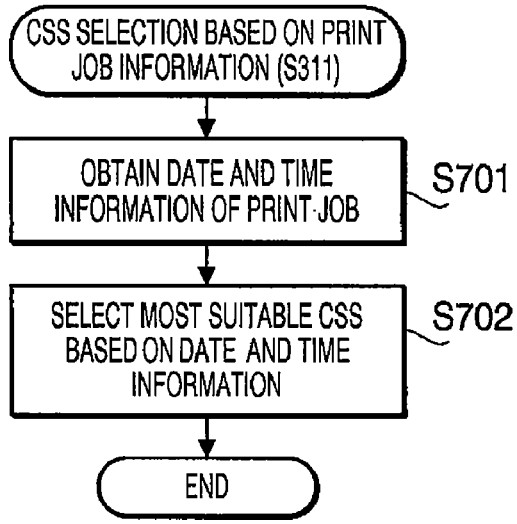
FIG. 14 is a flowchart which shows a first example of a process of selecting CSS data using information of a print job.

If there are a plurality of replacement candidates (S308, Yes), it is determined whether one candidate is selected by a user (S309). It is noted whether the determination is made by the user or not is decided according to values of the determination rules in the above described replacement CSS data search table area 433. For example, if a decision rule is 0 and the user selects (S309, Yes), the CSS selection UI program 448 displays panel display information on the liquid crystal panel, and let the user select CSS data with the operation means 5 (S310). Further, for example, if the decision rule is 1 or 2, and replacement CSS data is determined according to an issue date and time of the print job or creation date and time of documents (S309, No), a process where CSS data is selected is executed (S311). Details of Steps S310 and S311 are shown in FIG. 13 and FIG. 14, which are described later.

In the above selection processes, if the replacement CSS data is selected (S312, Yes), the original CSS data is replaced with the replacement CSS data by the CSS data replacement handle program 445, intermediate data is generated by interpreting XHTML-print format data and the replacement CSS data (S313).

On the other hand, if replacement CSS data is not selected (S312, No), for example, in the case that the user does not select before time-out, or in the case that conditions of the decision rule are not met, intermediate data is generated by interpreting XHTML-print format data and the original CSS data (S307).

It is noted that as a format of the intermediate data, PCL or Postscript which are general PDL (Page Description Language) or proprietary page description data format may be applied.

Further, the data may be transformed directly to a print image not using intermediate data.

Then, after the intermediate data is generated, interpreting the intermediate data by the intermediate data-print data transformation program 433, the print image is generated (S314). In addition, the basic function program 441 activates the print unit 2 and printing is executed.

Then, details of Step S305 are explained.

FIG. 11 is a flowchart which shows a process of searching for replacement CSS data using <style> tag.

Step S305 is a search process in the case that CSS data is described directly in XHTML-print format data as shown in FIG. 6B. In the case, the control unit 4 extracts character strings which define CSS data in the <style> tag using a CSS search key generation program 446 (S401).

Then, the unit sorts the extracted character strings alphabetically by a rule set of style setting and by a statement block. Further, a character string from which linefeed codes, space codes and tab codes are deleted is generated (S402). The process of S402 is because it is necessary to make description order to be the same, since the order is not constant even in the exactly same print layouts. Thus, hash values which are calculated later are the same value for each of print layouts.

Next, a hash operation on the generated character string is executed, and a hash value is generated (S403). The above steps S401-S403 are executed by the CSS search key generation program 446.

Then, the replacement CSS data search table area 433 is searched for using the hash value generated by the CSS search program 447 as a search key (S404).

If identical item with the key in the replacement CSS data search table area 433 is found by the search (S405, Yes), the CSS data related to the item as a replacement candidate is obtained and the process (S410) is terminated.

If the identical item is not found (S405, No), a search request using the generated hash value as a key is issued to the replacement CSS data providing site ST1 by the CSS data acquisition program 444 (S406).

As a result thereof, if an identical item with the key is found in the replacement CSS data providing site ST1 (S407, Yes), the CSS data related to the item is obtained (S408), the hash value which is used as the key and the obtained replacement CSS data are additionally registered in the replacement CSS data search table area 433 and the CSS data memory area 432 (S409).

On the other hand, if the identical item is not found in the replacement CSS data providing site ST1 (S407, No), the process is terminated.

By the above described series of processes, in the case that there exists the adapted replacement CSS data, the data is obtained as the second layout definition data from the digital multi function processing machine 100 or the replacement CSS data providing site ST1.

Next, details of Step S304 are explained.

Figure 12:
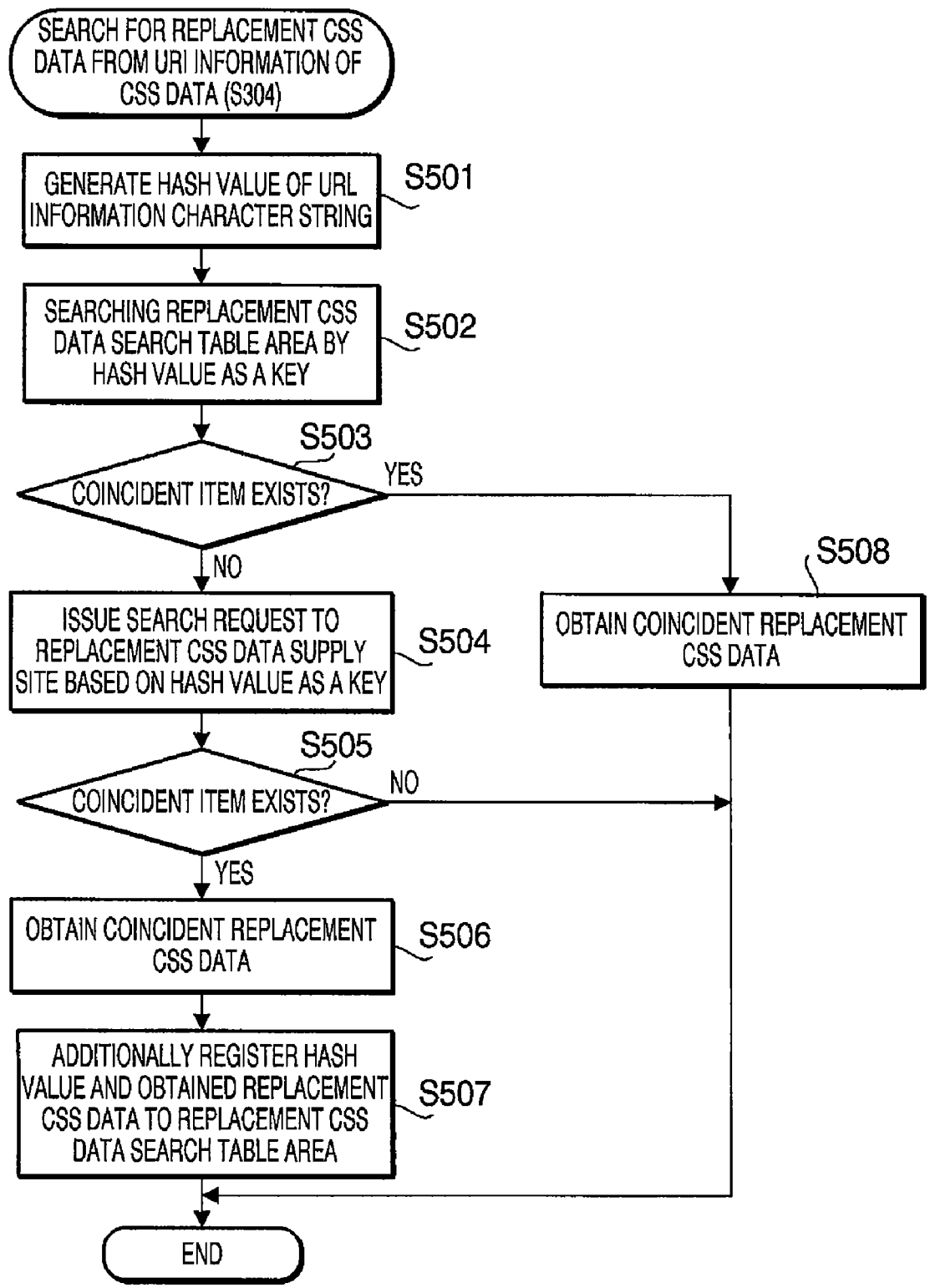
FIG. 12 is a flowchart which shows a process of searching for replacement CSS data using URI information linked to a location of CSS data.

FIG. 12 is a flowchart which shows a process of searching for replacement CSS data using URI information linked to a location of CSS data.

Step S304 is a search process in the case that there is indicated reference to the CSS data such as URI in the XHTML-print format data as shown in FIG. 6A. Then, the control unit 4 generates a hash value by hash operation on a URI information character string with the CSS search key generation program 446 (S501).

Then, the replacement CSS data search table area 433 is searched for using the generated hash value as a key (S502).

If an identical item with the hash value in the replacement CSS data search table area 433 is found by the search (S503, Yes), a replacement candidate is obtained and the process (S508) is terminated.

If the identical item is not found (S503, No), a search request using the hash value as a key is issued to the replacement CSS data providing site ST1 by the CSS data acquisition program 444 (S504).

As a result thereof, if an identical item is found in the replacement CSS data providing site ST1 (S505, Yes), the identical replacement CSS data is obtained (S506), the hash value and the obtained replacement CSS data are additionally registered in the replacement CSS data search table area 433 and the CSS data memory area 432 (S507).

On the other hand, if the identical item is not found in the replacement CSS data providing site ST1 (S505, No), the process is terminated.

By the above described series of processes, in the case that there exists the adapted replacement CSS data, the data is obtained from the digital multi function processing machine 100 or the replacement CSS data providing site ST1 as the second layout definition data.

Details of Step S310 are explained.

FIG. 13 is a flowchart which shows a process of making a user to select replacement CSS data with a liquid crystal panel.

The control unit 4 displays panel display information in the CSS data information on the liquid crystal panel with the CSS selection UI program 448 (S601). Names of a plurality of candidates for replacement CSS data displayed the liquid crystal panel are made to be selectable with an input means such as a key, a touch panel.

Then, the control unit 4 starts a selection waiting timer (S602). The unit waits for the user's selection with the input means (S603). If the selection is made within the time limit (S604, Yes), the selected CSS data is determined to be a replacement CSS data. If the selection is not made within the time limit (S604, No), the former CSS data indicated by the XHTML-print format data is determined to be used (S605).

Next, two examples of Step S311 are explained.

FIG. 14 is a flowchart which shows a first example of a process of selecting CSS data using information of a print job.

The control unit 4 obtains date and time information of the print job using the CSS selection program 449 (S701). Then, referring to CSS data information in the replacement CSS data search table area 433 and comparing a generation date and time of the print job and selection condition information corresponding to multiple replacement CSS data, replacement CSS data corresponding to selection condition information which is most suitable to the generation date and time is selected (S702).

For example, it is assumed that as selection condition information of four pieces of replacement CSS data represents spring, summer, autumn and winter, numerical values of upper limits and lower limits of each of periods [March-May], [June-August], [September-November], [December-February] are stored. Then, if the generation date and time of the print job obtained in Step S701 is September 10, since the data and time matches to the selection condition information of [September-November], replacement CSS data corresponding to selection condition information of [September-November] is obtained.

Figure 15:
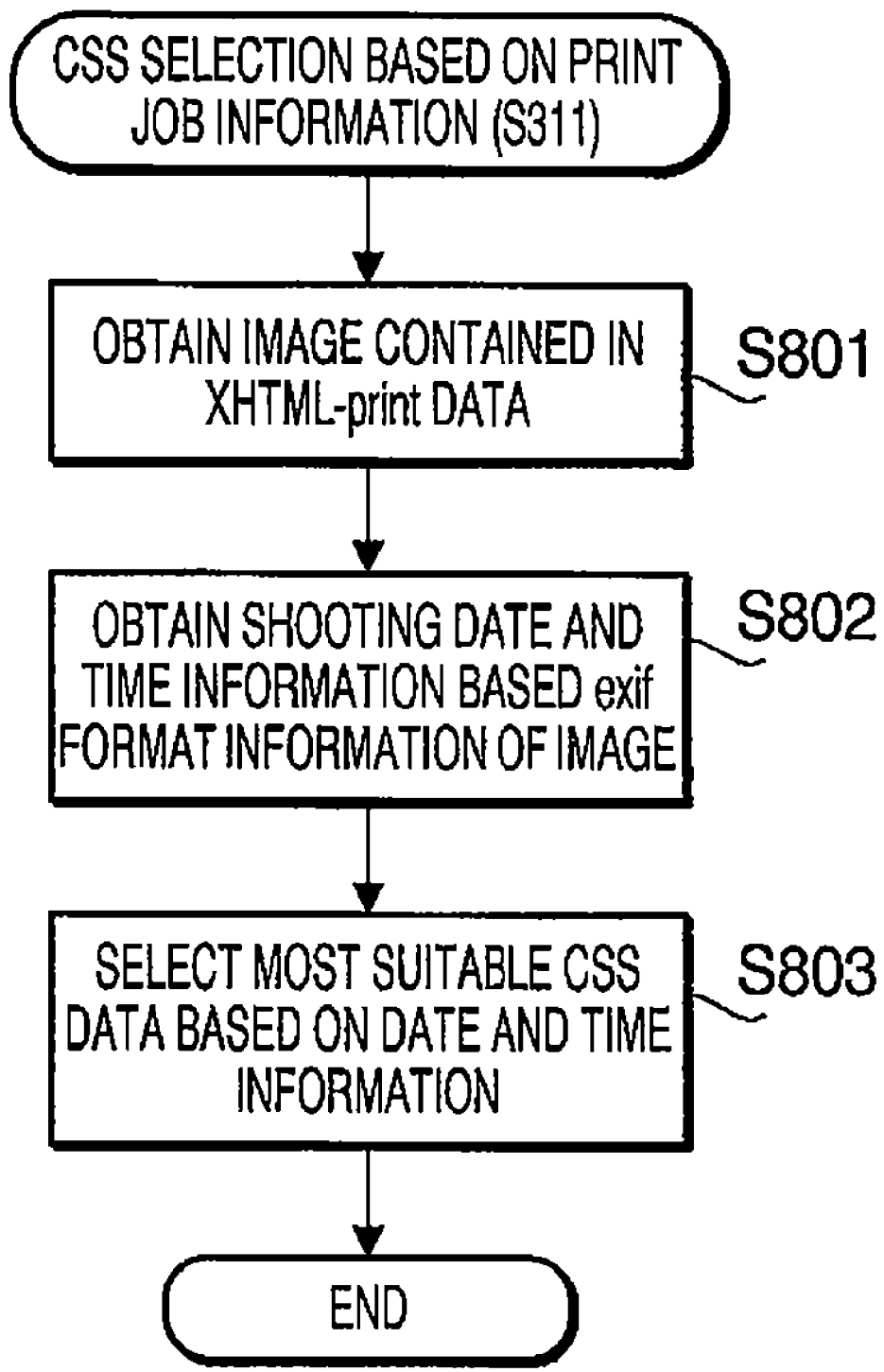
FIG. 15 is a flowchart which shows a second example of a process of selecting CSS data using information of a print job.

FIG. 15 is a flowchart which shows a second example of a process of selecting CSS data using information of a print job.

The second example is the case that a print job is issued by a television D2 while the television D2 is displaying images in the digital camera D3. Then, the control unit 4 obtains exif image by accessing URI linked to an image in XHTML-print data (S801).

Next, shooting date and time information is obtained for the information in exit format the obtained image (S802).

Then, similarly in Step S702 of the first example 1, referring to CSS data information in the replacement CSS data search table area 433, and comparing a shooting date and time and selection condition information corresponding to multiple replacement CSS data, replacement CSS data corresponding to selection condition information which is most suitable to the shooting date and time is selected (S803).

As described above, if there exist a plurality of candidates for replacement CSS data, according to generation date and time of the print job or shooting date and time of the image, the most suitable replacement CSS data can be selected.

<<Functions of Replacement CSS Data Providing Site ST1>>

Next, processes of the replacement CSS data providing site ST1 which is an example of a layout providing server are explained with reference to FIG. 16.

Figure 16:
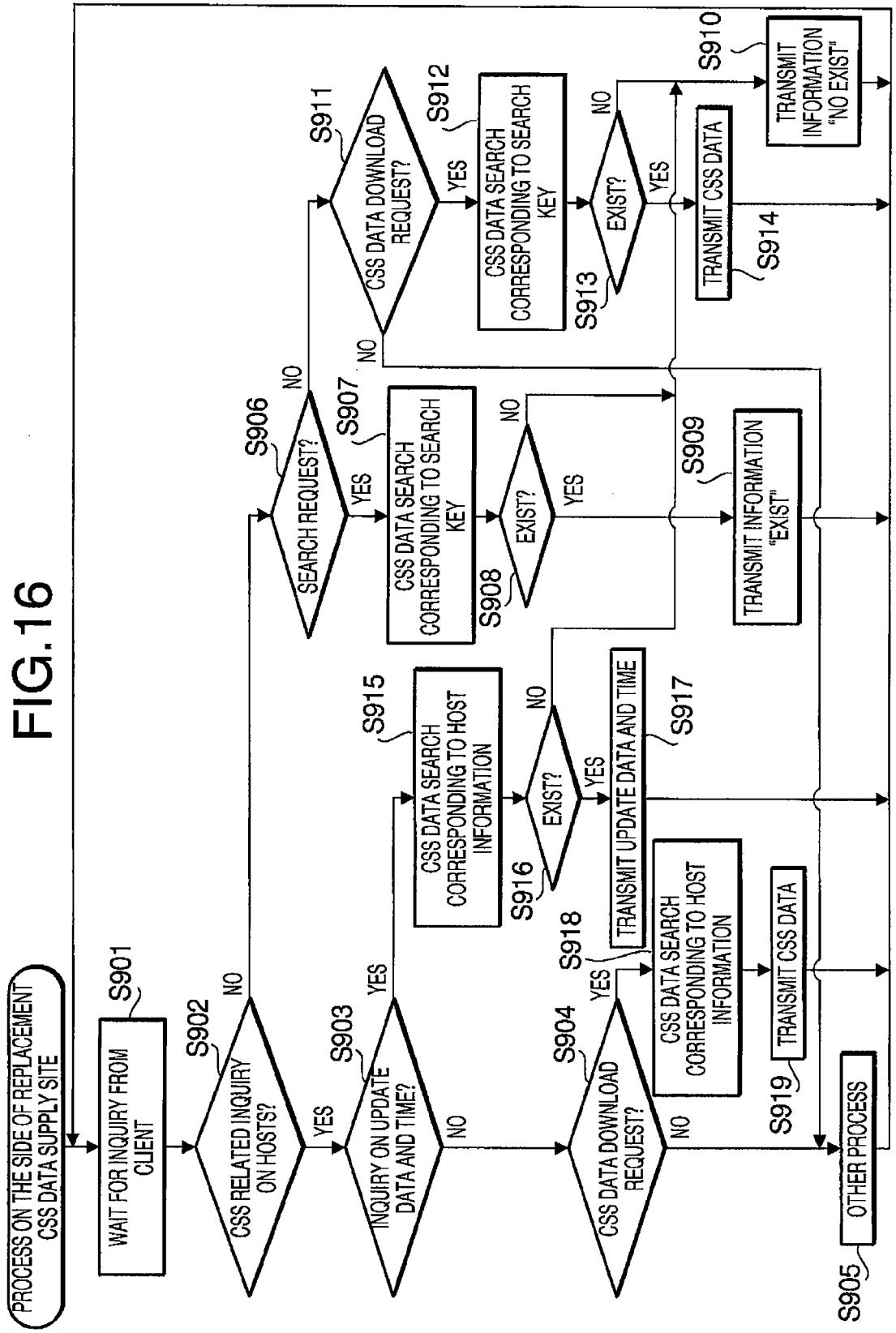
FIG. 16 is a flowchart which shows a process of the replacement CSS data providing site.

FIG. 16 is a flowchart which shows processes of the replacement CSS data providing site ST1.

The replacement CSS data providing site ST1 repeats Steps S901-S905.

The replacement CSS data providing site ST1 waits always for an inquiry from clients (S901).

Then, if the site receives an inquiry, it is determined whether the inquiry is related to CSS data associated with a host device (S902).

If the inquiry is related to a host device (S902, Yes), it is determined whether the CSS data of the host device is an inquiry for update date and time (S903).

If the inquiry is not for update date and time (S903, No), it is determined whether the inquiry is a request for downloading CSS data (S904).

If the inquiry is not a request for downloading CSS data (S904, No), the other process is executed and the process goes back to waiting for an inquiry from clients (S901).

If the inquiry is not related to a host device in Step S902 (No), it is determined whether the inquiry is a request for searching for CSS data (S906). If the inquiry is the request for searching for CSS data (S906, Yes), CSS data corresponding to a search key transmitted from the digital multi function processing machine 100 is searched for (S907). If corresponding CSS data is found (S908, Yes), information "exist" is transmitted (S909). If corresponding CSS data is not found (S908, No), information "no exist" is transmitted (S910). If the digital multi function processing machine 100 receives the information "exist", since the digital multi function processing machine transmits again a request for downloading the CSS data, the replacement CSS data providing site ST1 executes processes of Steps S911-S914.

If the inquiry is not a request for search in Step S906, it is determined whether the inquiry is a request for downloading CSS data (S911). If the inquiry is a request for downloading (S911, Yes), CSS data corresponding to a search key transmitted from the digital multi function processing machine 100 is searched for (S912). If corresponding CSS data is found (S913, Yes), CSS data is transmitted (S914). If corresponding CSS data is not found (S913, No), information "no exist" is transmitted (S910).

On the other hand, if the inquiry is not a request for downloading CSS data (S911, No), the process goes to Step S905 and the other process is executed.

If the inquiry is for an update date and time in Step S903 (Yes), for example, in the case that the digital multi function processing machine 100 asks an update date and time when the machine is activated, CSS data corresponding to information relating to the host is searched for (S915). If corresponding CSS data is found (S916, Yes), an update date and time of the CSS data is transmitted (S917). If corresponding CSS data is not found (S916, No), the information "no exist" is transmitted (S910).

If the inquiry is a request for downloading of CSS data in Step S904 (Yes), CSS data corresponding to host information is searched for (S918), and obtained the CSS data is transmitted to the digital multi function processing machine 100 (S919).

As described above, the replacement CSS data providing site ST1 can supply updated CSS data in response to the request of the digital multi function processing machine 100.

According to the digital multi function processing machine 100 in the embodiment, the invention has the following effects.

If a print job issued by the host device has an indication of CSS data, the digital multi function processing machine 100 searches for the replacement CSS data corresponding to the host device in the own replacement CSS data search table area 433 or the replacement CSS data providing site ST1. If the replacement CSS data is found, since the data is obtained and is replaced with CSS data in the XHTML-print, printing can be executed by using various CSS data, not limited to CSS data stored in the host device.

If a plurality of candidates for replacement CSS data are found, user's preference can be reflected by letting a user to select a candidate. Additionally, since replacement CSS data matched to the date and time can be searched for and obtained by using the issue date and time of the print job as a key, it is possible to choose print layout which is suitable to the season of the printing. Further, since replacement CSS data matched to the date and time can be searched for and obtained by using a shooting date and time of the image as a key, it is possible to choose print layout which is suitable to the season of the shooting.

The digital multi function processing machine 100 can obtain data promptly, because the machine obtains updated data form the replacement CSS data providing site ST1 at the time of activating or printing and accumulates the data in the replacement CSS data search table area 433 and the CSS data memory area 432, and searches in the machine's own memory area when it is necessary, by which the replacement CSS data can be obtained promptly. In addition, if there is a failure on the network, replacement CSS data can be obtained.

In the above, the embodiments of the invention are explained. The invention is not limited to the above described embodiments. Variations of the embodiments are implemented accordingly.

For example, in the embodiments, as an example of a printing device, a digital multi function processing machine 100 is explained. The printing device may be a printer which has only a printing function. As long as having a printing function, the printing device may be combined with other devices.

Further, a NVRAM is described as an example of a rewritable memory device. The rewritable memory device may be a hard disk or a magnetic tape.

In the described embodiments, a shooting date and time is an example of a date and time related to documents. In a case that e-mails are printed, the date and time may be a date and time of transmission or reception, or a date and time of generation of word processor documents.

In the described embodiment, the user interface to make a user to select replacement CSS data is displayed on a liquid crystal panel of the digital multi function processing machine 100. The user interface may be displayed on a liquid crystal display or a CRT which is separately installed from the digital multi function processing machine 100.

In addition, in the embodiments, a device, a digital multi function processing machine 100, is explained. The present invention may be configured as a computer program which controls the digital multi function processing machine or a printer.

In the above described embodiments, a data format of XHTML-print is described as an example of data of a print job, CSS data is described as an example of layout definition data. The data of the print job and the layout definition data are not limited to these data formats, the data of the print job and the layout definition data may be a data format compliant to other standards.

In the described embodiments, devices conforming to DLNA (registered trademark) are described as examples. Devices are not limited to devices conforming to DLNA. The devices may be devices which can issue a print job containing layout definition data such as CSS data.

In the described embodiments, when the digital multi function processing machine 100 is activated, the machine obtains replacement CSS data from the replacement CSS data providing site ST1 based on information of the host device, that is, information of the device which transmits. When printing is executed, the machine obtains replacement CSS data from the storage device of the digital multi function processing machine 100 in the print job. The replacement CSS data may be configured to be obtained from the replacement CSS data providing site ST1 based on the information which specifies a type of a transmitting device, when printing is executed. For example, replacement CSS data may be searched for in the replacement CSS data providing site ST1 based on a type name of the host device or a hash value of the type name obtained during the communication in the print process.

In particular, the above is realized in the following way. As a pre-process of S303 in FIG. 10, the print job issue device is specified. Afterward, the specified device is made to be a host i in FIG. 8, and processes corresponding to S124-S128 are executed. Further, the search process for the replacement CSS data by continuing the processes after S303. Here, specifying the print job issuing device is possible by comparing information contained in the print job and "host related information" in the replacement CSS data search table area 443.

What is claimed is:

1. A printing device which is able to layout print image data according to layout definition data that defines printing layout and print an image based on the print image data, comprising:
 a processing device configured to function as:
  a layout acquisition unit which obtains second layout definition data if at least one first layout definition data is included in a print job provided to the printing device;
  a layout replacement unit which replaces the at least one first layout definition data included in the print job with the second layout definition data obtained by the layout acquisition unit;
  an image generation unit which lays out and generates print image data according to the second layout definition data replaced by the layout replacement unit; and
  a print execution unit which executes printing based on the print image data generated by the image generation unit,
 wherein the layout definition data is arranged between a predetermined pair of tags;
 wherein the layout acquisition unit comprises:
  a search key generating unit configured to generate a search key based on the at least one first layout definition data included in the print jobs;
  a data search and acquisition unit configured to search and acquire the second layout definition data for replacing the at least one first layout definition data using the search key generated by the search key generating unit,
 wherein the search key generating unit reorders description units in the at least one first layout definition data based on a predetermined rule and generates the search key based on the reordered at least one first layout definition data,
 wherein the search key generating unit reorders the description units, such that an identical search key is generated for each of the at least one first layout definition data that have identical layouts and different orders of description units.

2. The printing device according to claim 1, wherein the layout acquisition unit searches for and obtains the second layout definition data for replacing the at least one first layout definition data from a layout providing server on a network, based on information that specifies a type of a transmitter for transmitting the print job to the printing device.

3. The printing device according to claim 1, wherein the layout acquisition unit searches for and obtains the second layout definition data for replacing the at least one first layout definition data from a layout providing server on a network, based on the search key generated from the at least one first layout definition data included in the print job or a search key generated from a reference origin which indicates the at least one first layout definition data.

4. The printing device according to claim 1, further comprising a layout accumulating unit which accumulates the second layout definition data obtained by the layout acquisition unit in a memory unit included in the printing device.

5. The printing device according to claim 1, wherein the layout acquisition unit searches for and obtains the second layout definition data for replacing the at least one first layout definition data from a memory unit included in the printing device, based on information that specifies a type of a transmitter for transmitting the print job to the printing device.

6. The printing device according to claim 1, wherein the layout acquisition unit searches for and obtains the second layout definition data for replacing the at least one first layout definition data from a memory unit included in the printing device, based on the search key generated from the at least one first layout definition data included in the print job or a search key generated from a reference origin which indicates the at least one first layout definition data.

7. The printing device according to claim 1, wherein the layout definition data is linked to specific data which specifies a period of time, and wherein the layout acquisition unit obtains the layout definition data linked to the specific data as the second layout definition data in a case that a date and time which is indicated by date-and-time data included in the print job is within the period of time.

8. The printing device according to claim 7, wherein the date-and-time data is related to a document to be printed.

9. The printing device according to claim 7, wherein the date-and-time data is a date and time when a print job is transmitted to the printing device.

10. The printing device according to claim 1, further comprising a selection unit which selects a second layout definition data for replacing the at least one first layout definition data from plural second layout definition data in a case that the layout acquisition unit obtains the plural second layout definition data, and wherein the layout replacement unit replaces the second layout definition data selected by the selection unit with the at least one first layout definition data.

11. The printing device according to claim 10, further comprising a display device, and wherein the selection unit displays a user interface on the display device so that the user can select the second layout definition data to replace the at least one first layout definition data from the plural second layout definition data.

12. A non-transitory computer-readable recording medium storing a program containing instructions which, when executed by a computer of a printing device, causes the computer to implement the steps of:
 obtaining second layout definition data if a print job provided to the printing device includes at least one first layout definition data;
 replacing the at least one first layout definition data included in the print job with the second layout definition data obtained by the obtaining step;
 laying out and generating print image data according to the second layout definition data replaced by the replacing step; and
 executing printing based on the print image data generated by the image generation unit,
 wherein the layout definition data is arranged between a predetermined pair of tags;
 wherein the obtaining step further comprising the steps of:
  generating a search key based on the at least one first layout definition data included in the print jobs;
  searching and acquiring the second layout definition data for replacing the at least one first layout definition data using the search key generated by generating step,
 wherein the generating step further comprising the steps of: reordering description units in the at least one first layout definition data based on a predetermined rule and generating the search key based on the reordered at least one first layout definition data,
 wherein the description units in the at least one first layout definition data are reordered, such that an identical search key is generated for each of the at least one first layout definition data that have identical layouts and different orders of description units.

13. A printing device which is connected to a network to which plural host devices are connected and capable of executing printing according to a print job transmitted from one of the host devices via the network, comprising:
- a storage unit which accumulates plural layout definition data which define printing layouts; and
- a processing device configured to function as:
  - a first layout acquisition unit which obtains second layout definition data for replacing at least one first layout definition data by searching in the storage unit in a case that the print job transmitted via the network includes the at least one first layout definition data;
  - a second layout acquisition unit which obtains second layout definition data for replacing at least one first layout definition data from a layout providing server connected to the network in a case that a replaceable second layout definition data does not exist in the storage unit;
  - a layout replacement unit which replaces the at least one first layout definition data included in the print job with the obtained second layout definition data;
  - an image generation unit which lays out and generates print image data according to the second layout definition data replaced by the layout replacement unit; and
  - a print execution unit which executes printing based on the print image data generated by the image generation unit,
- wherein the layout definition data is arranged between a predetermined pair of tags;
- wherein the layout acquisition unit comprises:
  - a search key generating unit configured to generate a search key based on the at least one first layout definition data included in the print jobs;
  - a data search and acquisition unit configured to search and acquire the second layout definition data for replacing the at least one first layout definition data using the search key generated by the search key generating unit,
- wherein the search key generating unit reorders description units in the at least one first layout definition data based on a predetermined rule and generates the search key based on the reordered at least one first layout definition data,
- wherein the search key generating unit reorders the description units, such that an identical search key is generated for each of the at least one first layout definition data that have identical layouts and different orders of description units.

14. The printing device according to claim 13, further comprising:
- a data update unit which obtains newly second layout definition data from the layout providing server and adds the newly obtained second layout definition data to the storage unit.

15. The printing device according to claim 14, wherein the data update unit obtains a server-update date and time when second layout definition data is added and stored by the storage unit from the layout providing server, and adds the newly obtained second layout definition data to the storage unit in a case that an update date and time when the newly obtained second layout definition data is added to the storage unit is older than the server update date and time.

16. A printing device according to claim 13, wherein the storage unit stores second layout definition data corresponding to each of the plural host devices, and wherein the first layout acquisition unit selects and obtains second layout definition data corresponding to the host device from the storage unit, according to information included in the print job, in order to specify a host device which transmits the print job.

17. The printing device according to claim 13, wherein the first layout acquisition unit selects and obtains one layout definition data related to a selection condition which the at least one first layout definition data satisfies from plural predetermined selection conditions related to each of plural layout definition data accumulated in the storage unit.

18. A printing device which is connected to a network to which a plurality of host devices are connected and capable of executing printing according to a print job transmitted from one of the host devices via the network, comprising:
- a processing device configured to function as:
  - a layout acquisition unit which obtains at least one second layout definition data that is different from at least one first layout definition data if the transmitted print job includes the at least one first layout definition data;
  - a selection unit which selects second layout definition data related to one selection condition that the at least one first layout definition data satisfies from selection conditions determined in relation to each of plural second definition data in a case that the layout acquisition unit obtains plural second layout definition data;
  - a layout replacement unit which, in a case that the layout acquisition unit obtains one second layout definition data, replaces the at least one first layout definition data with the obtained second layout definition data, and in a case that the layout acquisition unit obtains plural second layout definition data, replaces the at least one first layout definition data with the second layout definition data selected by the selection unit;
  - an image generation unit which lays out and generates print image data according to the second layout definition data replaced by the layout replacement unit; and
  - a print execution unit which executes printing based on print image data generated by the image generation unit,
- wherein the layout definition data is arranged between a predetermined pair of tags;
- wherein the layout acquisition unit comprises:
  - a search key generating unit configured to generate a search key based on the at least one first layout definition data included in the print jobs;
  - a data search and acquisition unit configured to search and acquire the at least one second layout definition data for replacing the at least one first layout definition data using the search key generated by the search key generating unit,
- wherein the search key generating unit reorders description units in the at least one first layout definition data based on a predetermined rule and generates the search key based on the reordered at least one first layout definition data,
- wherein the search key generating unit reorders the description units, such that an identical search key is generated for each of the at least one first layout definition data that have identical layouts and different orders of description units.

19. A printing device which is connected to a network to which a plurality of host devices are connected and capable of executing printing according to a print job transmitted from one of the hosts via the network, comprising:

a processing device configured to function as:
- a layout acquisition unit which obtains at least one second layout definition data that is different from at least one first layout definition data in a case that the transmitted print job includes the at least one first layout definition data;
- a selection unit which is operable by an operator to select one second layout definition data from plural second layout definition data in a case that the layout acquisition unit obtains plural second layout definition data;
- a layout replacement unit which, in a case that the layout acquisition unit obtains one second layout definition data, replaces the at least one first layout definition data with the obtained second layout definition data, and in a case that the layout acquisition unit obtains plural second layout definition data, replaces the at least one first layout definition data with the second layout definition data selected by the selection unit; an image generation unit which layouts and generates print image data according to the second layout definition data replaced by the layout replacement unit; and
- a print execution unit which executes printing based on the print image data generated by the image generation unit, wherein the layout definition data is arranged between a predetermined pair of tags;

wherein the layout acquisition unit comprises:
- a search key generating unit configured to generate a search key based on the at least one first layout definition data included in the print jobs;
- a data search and acquisition unit configured to search and acquire the at least one second layout definition data for replacing the at least one first layout definition data using the search key generated by the search key generating unit, wherein the search key generating unit reorders description units in the at least one first layout definition data based on a predetermined rule and generates the search key based on the reordered at least one first layout definition data, wherein the search key generating unit reorders the description units, such that an identical search key is generated for each of the at least one first layout definition data that have identical layouts and different orders of description units.

* * * * *